(12) United States Patent
Schroeder et al.

(10) Patent No.: US 6,659,426 B2
(45) Date of Patent: Dec. 9, 2003

(54) CHARGE VALVE IN A HIGH PRESSURE AIR CONDITIONING SYSTEM

(75) Inventors: Fred G. Schroeder, Grosse Ile, MI (US); Eric W. Kesler, Northville, MI (US); Zhongping Zeng, Haslett, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 152 days.

(21) Appl. No.: 10/027,018

(22) Filed: Dec. 26, 2001

(65) Prior Publication Data

US 2003/0116740 A1 Jun. 26, 2003

(51) Int. Cl.[7] .......................... F16K 11/02; F16L 29/02
(52) U.S. Cl. ..................................... 251/149.6; 251/359
(58) Field of Search ................. 251/142–156, 251/157–204, 356–368

(56) References Cited

U.S. PATENT DOCUMENTS

| | | | |
|---|---|---|---|
| 3,057,372 A | 10/1962 | Sutton et al. | |
| 3,144,237 A | 8/1964 | Zurit et al. | |
| 3,419,040 A | 12/1968 | Thibodeaux | |
| 3,965,980 A | * 6/1976 | Williamson | 137/496 |
| 4,015,819 A | 4/1977 | Zahid | |
| 4,117,976 A | * 10/1978 | Doherty, Jr. | 137/625.18 |
| 4,494,727 A | * 1/1985 | Babitzka et al. | 201/172 |
| 4,601,475 A | 7/1986 | Nocholson | |
| 4,703,914 A | * 11/1987 | Hoffmann | 251/149.6 |
| 4,712,619 A | 12/1987 | Stepp et al. | |
| 4,830,115 A | 5/1989 | Polan | |
| 5,067,521 A | 11/1991 | Jenks et al. | |
| 5,249,600 A | 10/1993 | Blume | |
| 5,290,009 A | 3/1994 | Heilmann | |
| 5,464,042 A | 11/1995 | Haunhorst | |
| 5,501,397 A | * 3/1996 | Holt | 251/149.6 |
| 5,884,705 A | 3/1999 | Hill, Jr. | |
| 6,050,295 A | 4/2000 | Meisinger et al. | |
| 6,095,190 A | * 8/2000 | Wilcox et al. | 251/149.6 |
| 6,237,631 B1 | 5/2001 | Giesler et al. | |

FOREIGN PATENT DOCUMENTS

| | | |
|---|---|---|
| EP | 0533369 A1 | 3/1993 |
| EP | 1188975 A2 | 3/2002 |
| JP | 2001248740 A | 9/2001 |

* cited by examiner

*Primary Examiner*—Paul J. Hirsch
(74) *Attorney, Agent, or Firm*—MacMillan, Sobanski & Todd LLC

(57) ABSTRACT

A service valve for a CO2 refrigerant based air conditioning system in a vehicle. The service valve includes a dynamic seal that is opened and closed during servicing of the air conditioning system. The dynamic seal provides for good overall sealing as well as good permeation resistance.

20 Claims, 10 Drawing Sheets

CHARGE VALVE IN A HIGH PRESSURE AIR CONDITIONING SYSTEM

BACKGROUND OF INVENTION

The present invention relates to vehicle air conditioning (A/C) systems, and more particularly to charging valves for such systems.

Conventionally air conditioning systems for vehicles have employed R12 or more recently R134a as the refrigerant. For some situations, however, it is advantageous to employ carbon dioxide ($CO_2$), or $CO_2$ with a co-fluid, as the refrigerant. One drawback, however, with employing a $CO_2$ based refrigerant is that it operates in the A/C system at a significantly higher pressure and temperature.

Even at this higher pressure, the A/C system must still seal well enough that the refrigerant does not leak out. Conventional seals employed for the lower pressure A/C systems have generally proven to be inadequate to maintain adequate seals in the high pressure $CO_2$ systems.

In particular, A/C systems in vehicles require one or more charging (service) valves, for testing, charging, discharging and evacuating the refrigerant from the system. These charging valves in a $CO_2$ system must seal-in the high pressure refrigerant while preventing permeation, leakage and rapid decompression damage to seals. Also, the charging valve must be temperature resistant, so that it can maintain a good seal over a long period of time under a wide range of temperatures, including temperatures as high as 180 degrees Celsius that can be reached when operating a $CO_2$ based A/C system. Further, the charging valve must immediately close and seal as the service tool is removed. Charging valves in the current relatively low pressure A/C systems have proven to be inadequate to meet all of these requirements.

Thus, it is desirable to have a charging valve for a vehicle A/C system that overcomes the drawbacks of the prior charging valves when operating in a high pressure $CO_2$ system. In particular, it is desirable to have an A/C system with a charging valve that will seal under high pressure, avoiding permeation, leakage, and rapid decompression damage, as well as maintain the seal at various temperatures, and seal immediately as the service tool is removed.

SUMMARY OF INVENTION

In its embodiments, the present invention contemplates a service valve for an air conditioning system adapted to selectively connect pressurized refrigerant within a cavity of the air conditioning system to a service tool. The service valve has a valve body defining a valve bore having a first end exposed to the cavity and a second end adapted for operatively engaging the service tool, with the bore including a dynamic valve seating surface. The service valve also has a valve pin assembly, mounted and slidable within the valve bore between an open position and a closed position, with the valve pin assembly including a dynamic seal portion which is made of a thin metal layer and a first, relatively thinner, elastomeric material layer covering the metal layer that is substantially softer than the metal layer, and with the dynamic seal portion sealingly engagable to the dynamic valve seating surface through surface contact with the elastomeric layer when the valve pin assembly is in the closed position.

An embodiment of the present invention provides for a charging valve for an A/C system with a dynamic valve slidable within a valve body that has a valve sealing material formed of a metal coated with a thin layer of elastomeric material. Preferably, this valve sealing material is a sheet steel coated with a thin layer of rubber.

An embodiment of the present invention also provides for an inverted pin valve having a pin-to-adapter seal, allowing a pin valve and a pin valve seat to be formed integrally. The pin valve seal also may be formed of a rubber coated steel, or a double seal arrangement.

An advantage of the present invention is that the charging valve seals against both permeation and leakage, in a high pressure A/C system under various temperature conditions.

Another advantage of the present invention is that the charging valve seals immediately as a service tool is removed, after charging or testing an A/C system.

DETAILED DESCRIPTION

Figure 1:
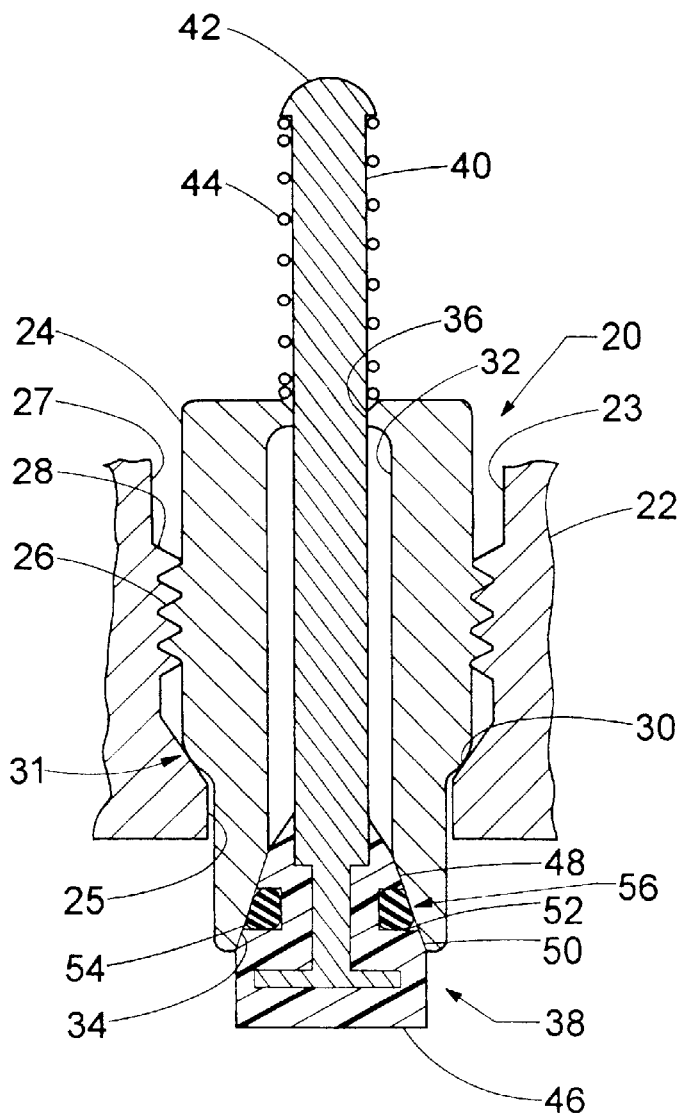
FIG. 1 is a cross sectional view of a first embodiment of a valve assembly mounted in a housing.
Figure 3:
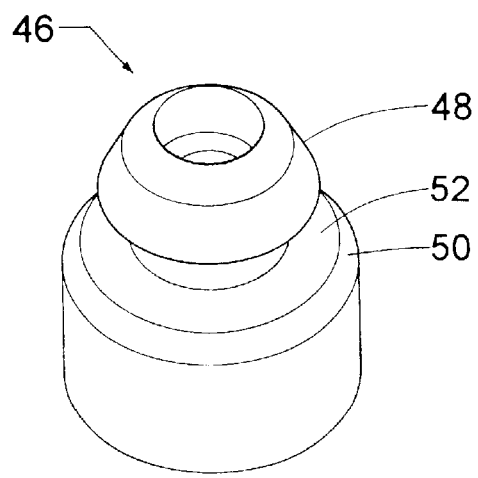
FIG. 3 is a perspective view of the primary valve seal of FIG. 1.
Figure 2:
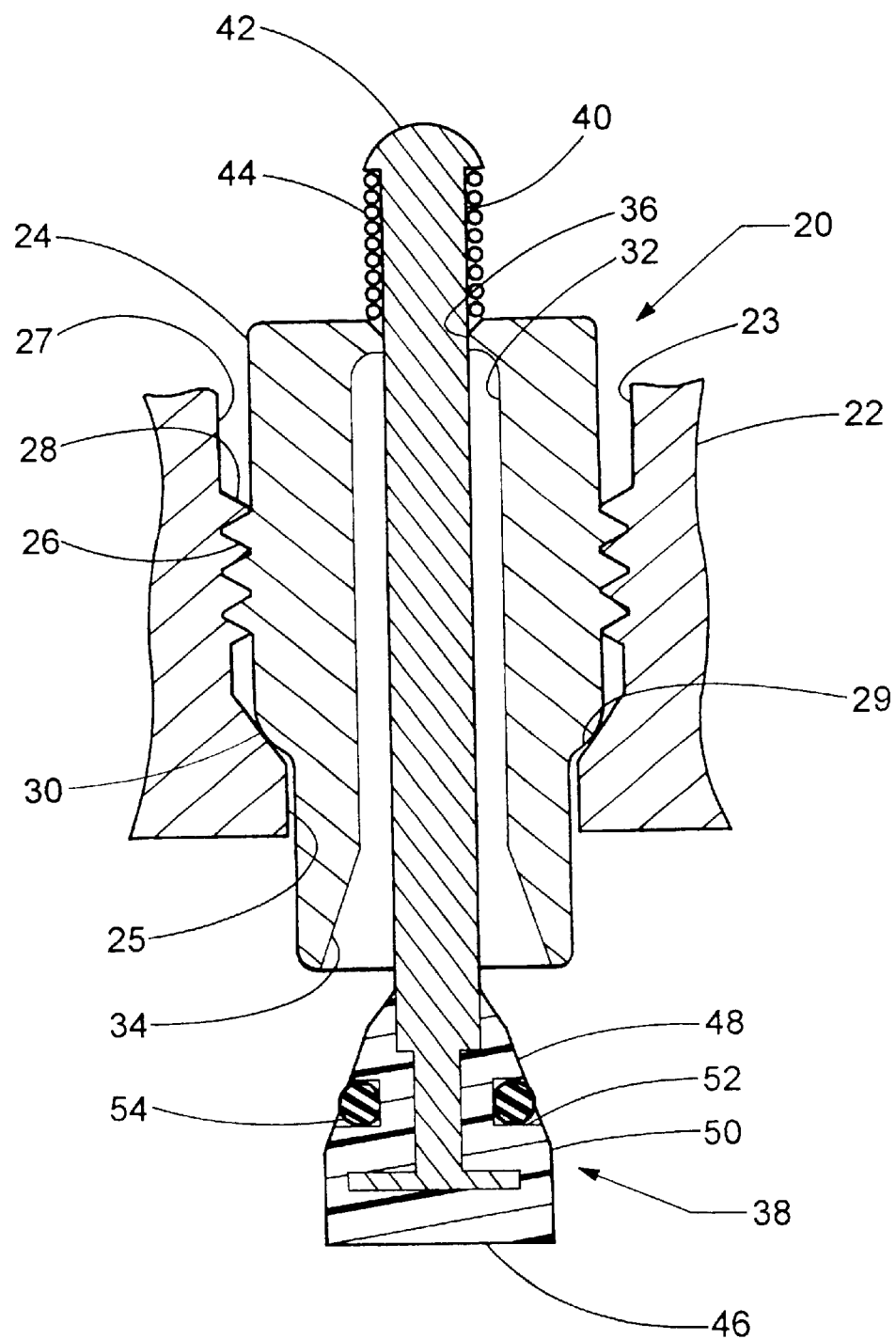
FIG. 2 is a view similar to FIG. 1, but with the valve shown in the open position.

FIGS. 1–3 illustrate a charging (service) valve assembly 20 that mounts in to an adapter housing 22, a portion of which is shown. The housing 22 forms a portion of a vehicle A/C system (not shown) that is designed to operate under high pressure with a $CO_2$ based refrigerant. The housing 22, for example, may be configured to mount near or to an A/C compressor (not) shown at a suction and/or a discharge port, or it may be configured to mount along refrigerant lines at other locations in the A/C system as well, as are typical locations for charging valves in conventional, vehicle A/C systems as well. This valve assembly 20 allows for a service technician working on a vehicle's A/C system to add, remove, and/or test the refrigerant in the system.

The housing 22 includes a bore 23, which has a first opening 25 that is exposed to refrigerant, and extends to a second opening 27, which is outside of the A/C system. The valve assembly 20 includes a valve pin body 24 that inserts into the bore 23. The valve body 24 includes threads 26 that screw into corresponding threads 28 on the housing 22. The valve body 24 is screwed into the housing 22 until its seating surface 30 is pressed tight against the seating surface 29 of the housing 22, to assure a tight seal against CO2 leakage along the surface of the bore 23. This forms a static seal 31 in that the seal is formed upon assembly of the components, but the seal 31 is not regularly broken for servicing of the A/C system. It would only be broken if the valve assembly is defective or becomes damaged and needs replacing.

The valve body 24, in turn, includes a bore 32. This bore 32 extends from a first opening, having a sealing surface 34, which is exposed to refrigerant, to a second opening, having a pin guide surface 36, which is exposed to the atmosphere outside the A/C system. Mounted within and extending through the bore 32 is a valve pin assembly 38. The assembly 38 includes a valve pin 40 and a spring 44, with the pin 40 inserted up through the bore 32, and the spring 44 loaded onto the pin 40 prior to forming a retention head 42 on the pin 40. The spring 44 biases the pin head 42 away from the valve, causing the valve to stay in its closed position.

The valve pin assembly 38 also includes a primary valve seal 46 that is formed around the bottom of the valve pin 40 prior to assembling the pin 40 into the valve body 24. The forming of the pin 40 within the seal 46 precludes a leak path at the pin-to-seal interface. The primary seal 46 is generally conical in shape and includes a pair of sealing faces 48, 50, with a recess 52 located between the two faces 48, 50. The faces 48, 50 are shaped to make surface contact with the sealing surface 34 of the valve body 24, when the valve assembly is closed, and completely seal off the bore 32. This seal 46 is required to have good permeation and rapid decompression resistance.

This seal 46 is preferably made of Vespel (manufactured by DuPont), which is a Polyimide resin that is formed in a sintering process, similar to the way that powdered metal is formed, rather than the typical molding processes used with common plastics. Optionally, this seal 46 may be made of polyetheretherketone (PEEK), or an engineered polymer material with similar properties. PEEK includes the properties of low permeation of gases and low creep (cold flow) values. The PEEK is preferably formed to its final shape via an injection molding process. As another alternative, this seal 46, may also be made of brass, or copper, either bare or tin plated. If formed of brass or copper, the seal 46 is better formed with a threaded bore, with the pin 40 having a corresponding threaded extension, as will be discussed below in relation to the second embodiment.

The sealing of the primary seal 46 is assured due to the load of the spring 44, as well as the pressure of the CO2 refrigerant itself pressing against the primary seal 46. While the primary seal 46 provides the advantage of good long term sealing with good permeation resistance, it does not provide for immediate sealing upon valve closing because the material is generally too hard to immediately conform to the mating surface 34.

So, mounted about the primary seal 46, within the recess 52, is an O-ring (secondary) seal 54. The O-ring seal 54 is sized so that it is compressed between the recess 52 and the sealing surface 34. The O-ring seal 54 is preferably made of an elastomeric material, which can be a fluorocarbon rubber (FKM), such as Viton made by DuPont, or a material with similar properties. Because the O-ring seal 54 is made of this type of elastomeric material, it will conform and seal quickly upon valve closing. However, this elastomeric material does not provide for good permeation resistance. But permeation of the CO2 refrigerant is not a significant concern since, within a few minutes of closing, the primary seal 46, which has very good permeation resistance, will fully seat against the sealing surface 34.

Thus, the primary seal 46 and the O-ring seal 54 together form a good dynamic seal 56, in that this seal may be opened and closed repeatedly while testing or servicing the vehicle A/C system. Overall, then, this dynamic seal 56 will provide for long term permeation resistance and leakage resistance. Both the primary seal 46 and the O-ring seal 54 can operate as needed under various temperature conditions, even when temperatures reach as high as 180 degrees Celsius. This high pressure, high temperature capability is required in order to assure adequate sealing when operating a CO2 based A/C system in a vehicle.

The dynamic seal 56 is opened by a technician using a service tool (not shown), which presses against the head 42 of the pin 40, causing the valve pin assembly 38 to move downward into its open position (as shown in FIG. 2) against the bias of the spring 44 and the refrigerant pressure. The tool is connected to testing equipment (not shown) or a temporary holding tank (not shown), which allows the technician access to the refrigerant in the A/C system without the refrigerant escaping. When finished, the technician merely removes the tool, allowing the valve pin assembly 38 to move to its closed position (as shown in FIG. 1). As it moves into its closed position, the elastomeric O-ring seal 54 immediately conforms and seals against the valve seat 34, preventing the refrigerant from escaping. Then, within a short time after that, the primary seal 46 conforms to the valve seat 34, allowing for a long term seal with good permeation resistance.

A second embodiment of a valve assembly is illustrated in FIGS. 4–7. The embodiment shown in FIGS. 4–7 has many items in common with that of FIGS. 1–3, and to avoid unnecessary repetition of the description, the same reference numerals have been used but falling within 100 series numbers. The significant differences between the first and second embodiment relate to the adapter housing 122, the primary seal 146 and the pin 140.

The adapter housing 122 includes a second set of screw threads 160, for allowing the valve assembly 120 to be connected to a service tool (not shown). The adapter housing 122 also includes a narrow passage 162 leading to a main refrigerant bore 164. This passage 162 is defined by a wall 166, and is sized to provide only a small clearance between the wall 166 and the side of the primary seal 146 when the valve pin assembly 138 is in an open position. This small clearance limits the amount of tipping of the pin 140 relative to the valve body 124 before the side of the primary valve seal 146 abuts the wall 166, thus preventing pin bending or bad sealing concerns due to excessive tipping of the pin 140.

The valve pin body 124 is preferably formed of brass, and screws into the housing 122. In order to assure a good static seal 131, the valve body 124 preferably includes a coating of tin to form the valve body seating surface 130. Once the valve body 124 is screwed into the housing 122, the tin will mate with the adapter housing seating surface 129, and form a good static seal.

Figure 4:
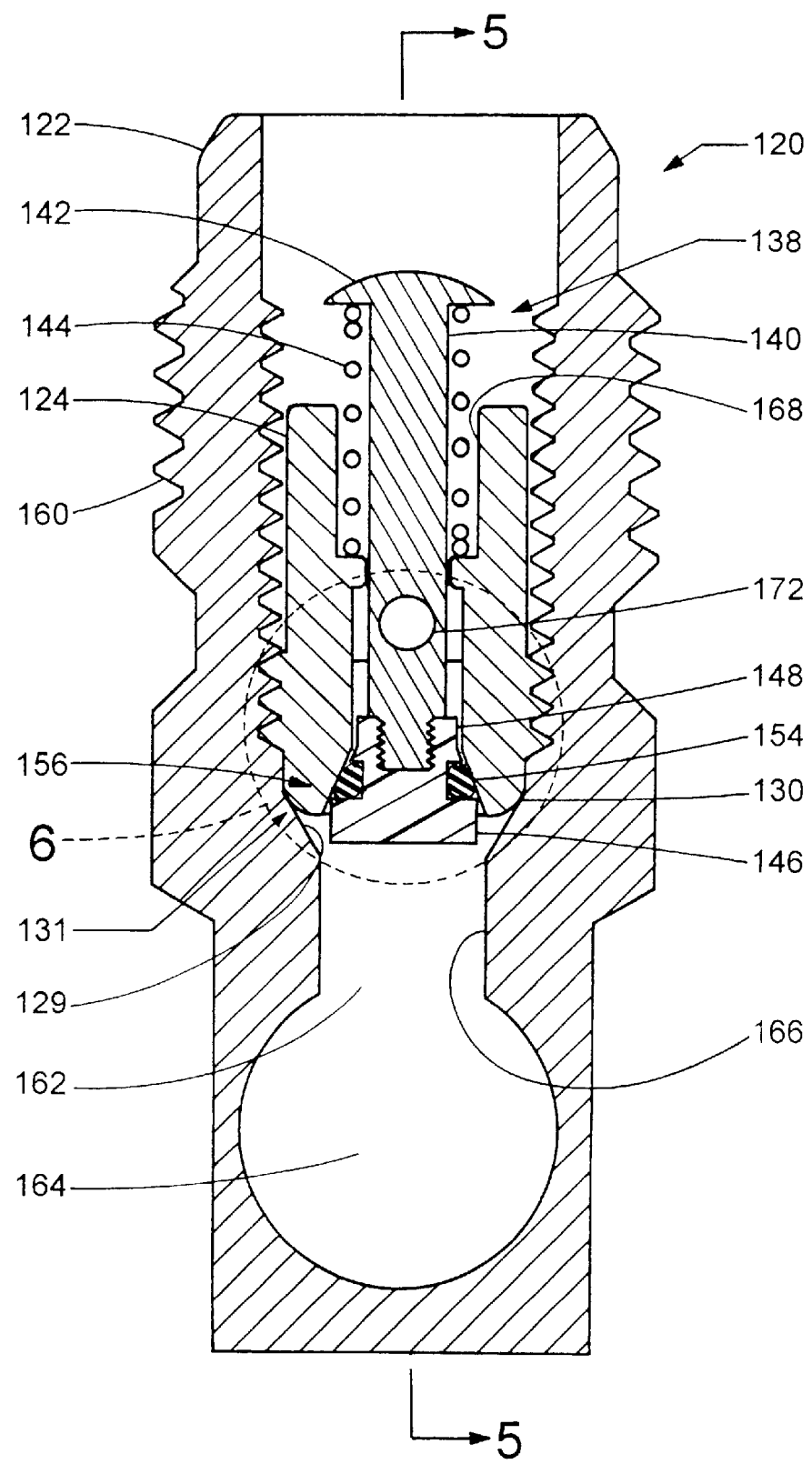
FIG. 4. is a cross sectional view of a valve assembly similar to FIG. 1, but illustrating a second embodiment.
Figure 5:
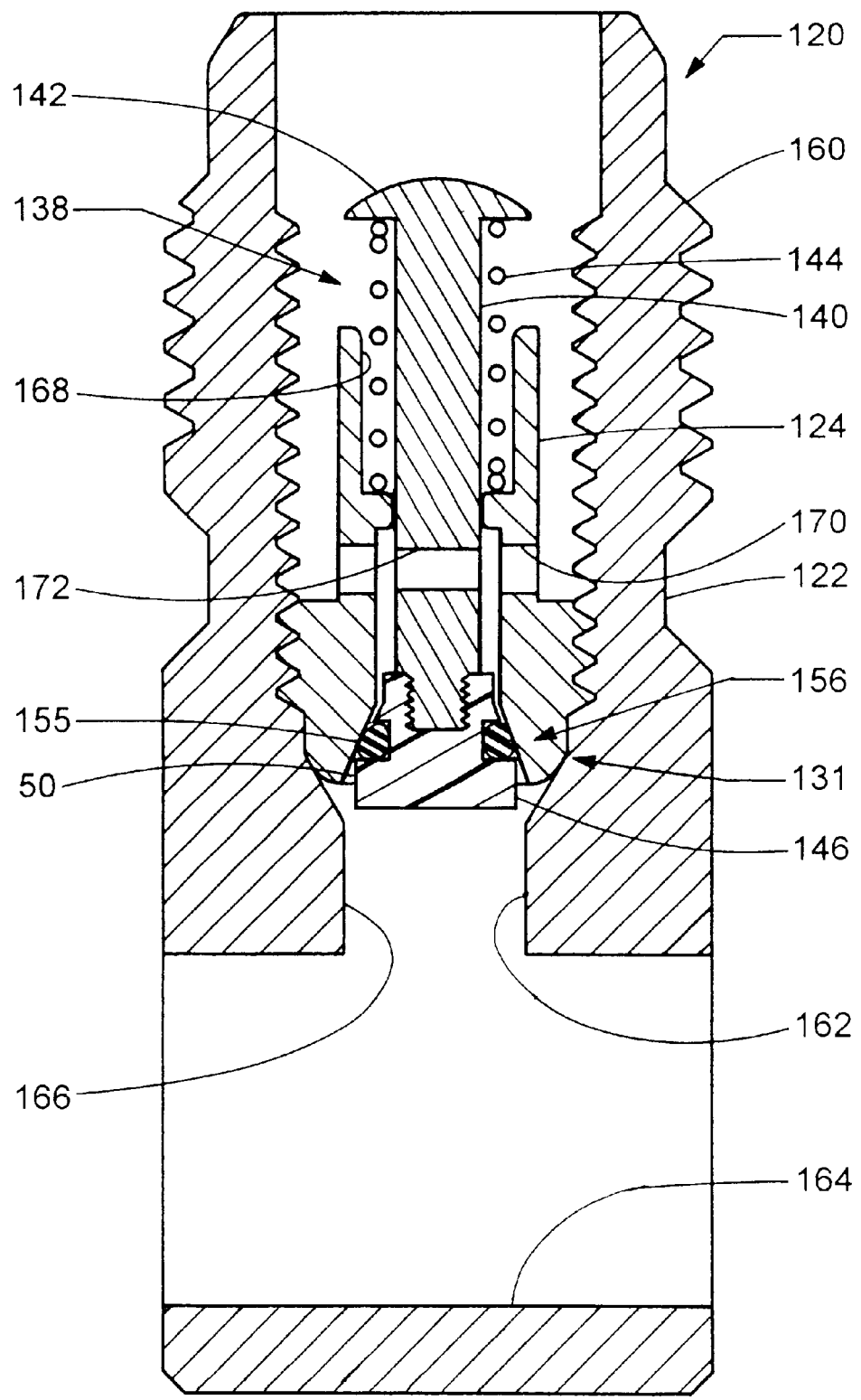
FIG. 5 is a cross sectional view taken along line 5—5 in FIG. 4.
Figure 6:
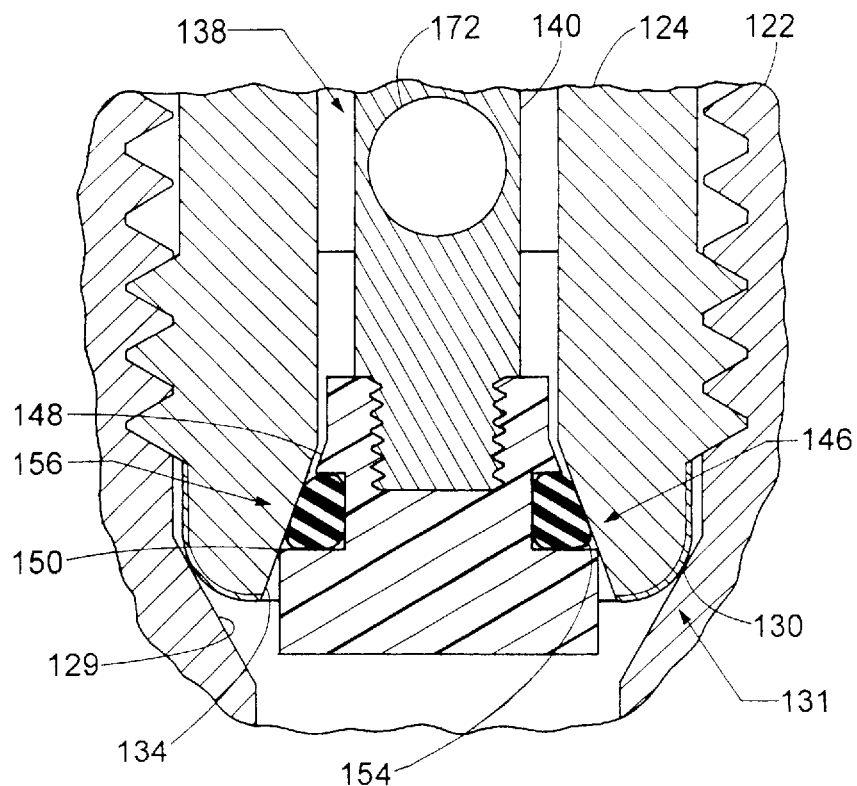
FIG. 6 is an enlarged view of a portion of the valve assembly, taken from encircled area 6 in FIG. 4.

The valve body 124 also preferably includes a spring guide recess 168 within which the spring 144 mounts. The pin head 142 is formed with a larger diameter than the spring recess 168, which will then limit the travel of the valve pin assembly 138. In this way, one can avoid spring damage due to over-travel of the pin 140. This valve body 124 additionally has an upper portion that is wider in one direction (as can be seen in FIG. 4) than in the other direction (as can be seen in FIG. 5), and includes refrigerant holes 170 that are generally adjacent to a refrigerant flow hole 172 in the pin 140. The shape of the valve body 124 not only provides for a place to grip the valve body 124 when screwing it in, but also provides a good flow path for the refrigerant through the valve assembly 120 via the refrigerant holes 170, 172.

The primary valve seal 146 is shaped differently than in the first embodiment. First, it is formed with a threaded recess, and the pin 140 includes a corresponding threaded portion. This allows the two pieces to be formed separately and then assembled together after forming. Second, the lower sealing surface 150 is squared-off so that it makes line contact with the valve body seat 134. And third, the upper face 148 is sized to be spaced from the seat 134. This configuration has the primary seal 146 seating on the refrigerant side of the O-ring seal 155, with no refrigerant pressure behind the O-ring seal 155. This assures that the primary seal 146, which is made of a harder and more durable material, will significantly reduce the pressurizing of the O-ring seal 154, thus insuring the overall integrity of the dynamic seal 156.

Figure 8:
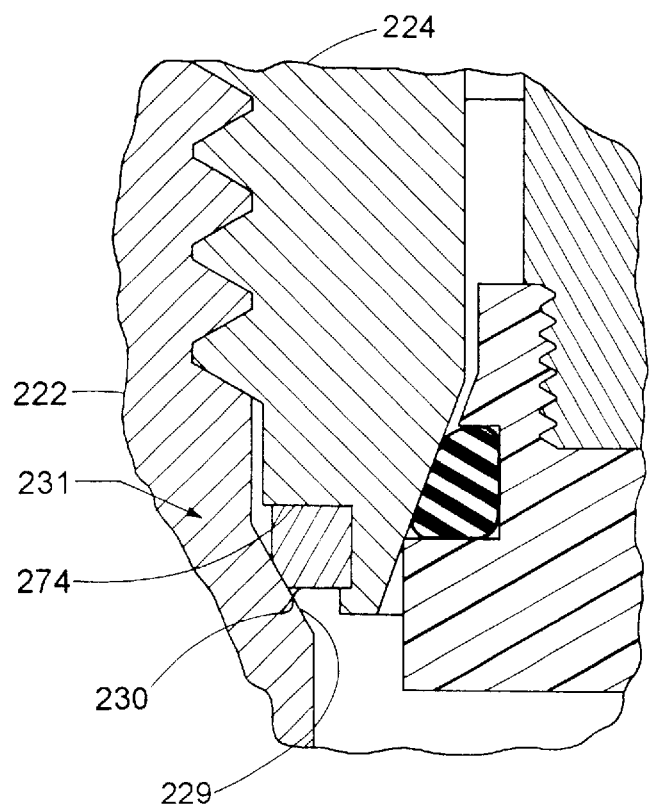
FIG. 8 is a view similar to FIG. 6, but illustrating a third embodiment of a valve assembly.
Figure 7:
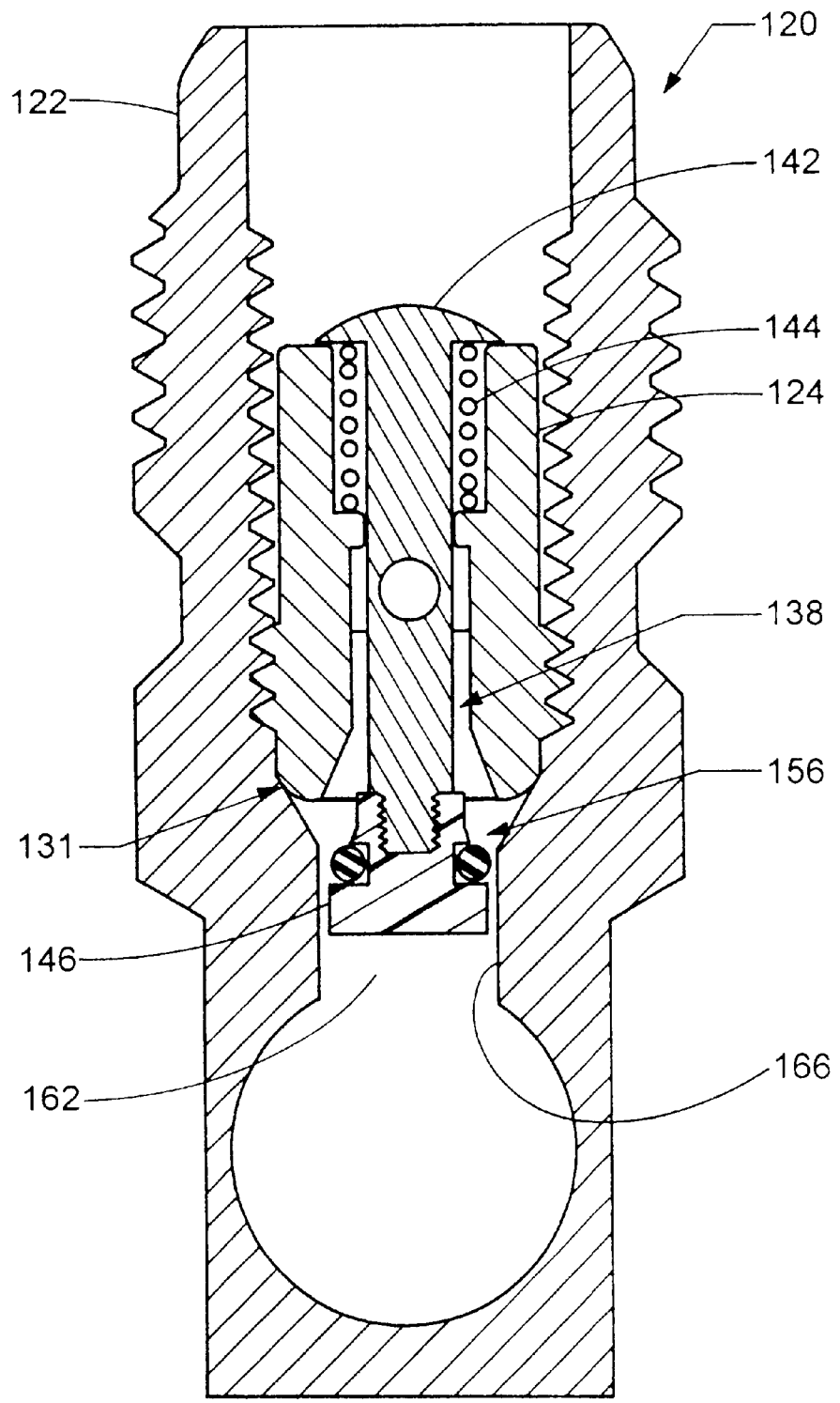
FIG. 7 is a view similar to FIG. 4, but with the valve shown in the full open position.

FIG. 8 illustrates a third embodiment of a valve assembly. The embodiment shown in FIG. 8 has many items in common with that of FIGS. 4–7, and to avoid unnecessary repetition of the description, the same reference numerals have been used but falling within the 200 series rather than 100 series numbers. The significant difference between the second and third embodiment relates to the static seal 231. The seating surface 229 of the adapter housing 222 is essentially the same. The valve body 224 now includes a recess 274 that receives a seal member 230, which is swaged over the recess 274 to mechanically lock and seal it to the valve body 224. Preferably, this seal member 230 is made of copper or copper with a tin plating, although it may be made of other materials with good permeation resistance, such as Vespel.

Figure 9:
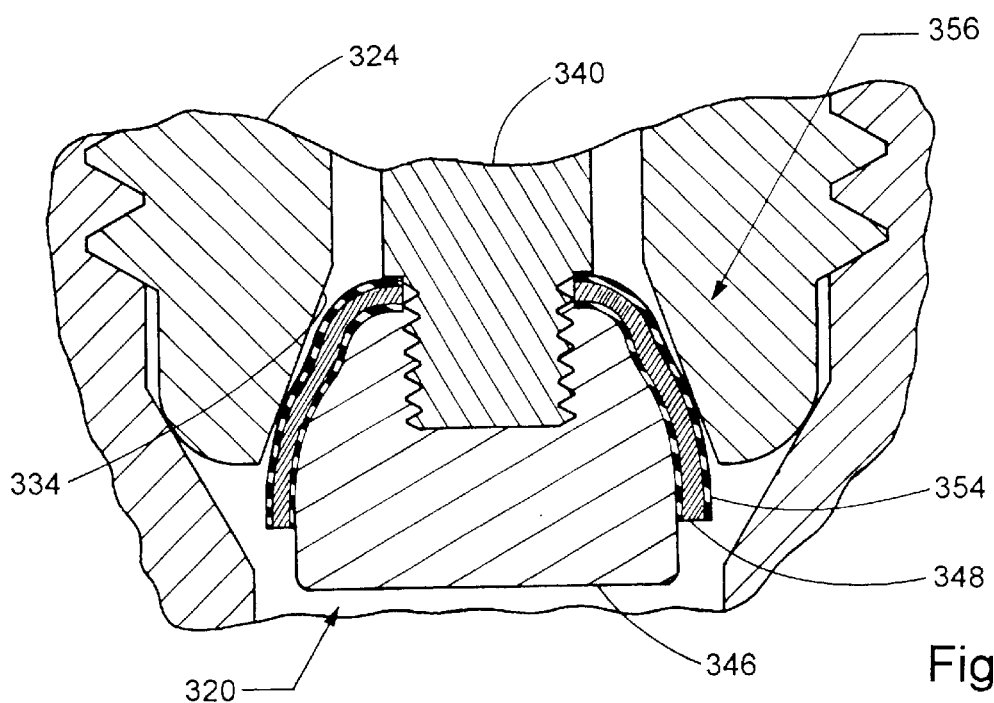
FIG. 9 is a view similar to FIG. 6, but illustrating a fourth embodiment of a valve assembly.

FIG. 9 illustrates a fourth embodiment of a valve assembly. The embodiment shown in FIG. 9 has many items in common with that of FIGS. 4–7, and to avoid unnecessary repetition of the description, the same reference numerals have been used but falling within the 300 series rather than 100 series numbers. The significant difference between the second and fourth embodiment relates to the dynamic seal 356. The sealing surface 334 of the valve body 324 is essentially the same. But the dynamic seal 356 is formed as a unitary seal, rather than as two separate sealing components. There is a brass support 346 threaded onto the valve pin 340. A steel seal 348 with a rubber coating 354 on both sides is mounted onto the brass support 346. Preferably, the steel substrate is on the order of about 0.010 inches thick, with a rubber coating on each side that is about 0.0025 inches thick. The thickness of the steel and rubber shown in this figure is exaggerated for aid in describing the invention. The steel seal 348 can be made of metals other than steel, if so desired, and the rubber coating 354 may be made of a different suitable elastomeric material. But the advantage with using this material combination is that it is readily available and inexpensive since other types of automotive applications employ a rubber coated steel for gaskets. This valve configuration also seals well because, as the valve is closing, the rubber 354 contacts the seating surface 334, and immediately conforms to it. This assures immediate sealing. Furthermore, since the rubber layers 354 are so thin and are compressed where they contact the seating surface 334, and the majority of the seal 356 is formed by the steel layer 348, there is good overall permeation resistance.

Figure 10:
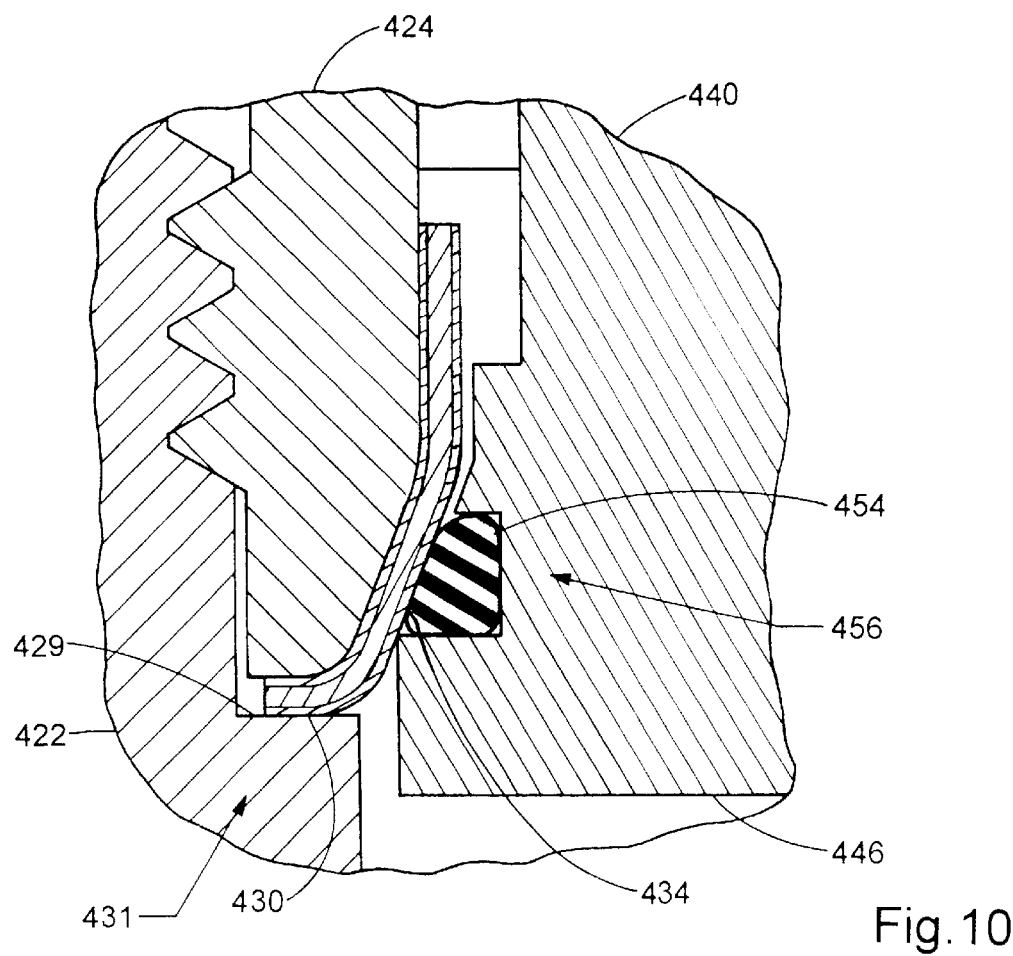
FIG. 10 is a view similar to FIG. 6, but illustrating a fifth embodiment of a valve assembly.

FIG. 10 illustrates a fifth embodiment of a valve assembly. The embodiment shown in FIG. 10 has many items in common with that of FIGS. 4–7, and to avoid unnecessary repetition of the description, the same reference numerals have been used but falling within the 400 series rather than 100 series numbers. The significant differences between the second and fifth embodiment relate to the static seal 431 and the dynamic seal 456. The pin 440 and primary seal 446 are preferably formed integrally, and are preferably made of brass, and again retain an O-ring seal 454. But these seals mate with a different seating surface. The seating surface 429 of the adapter housing 422 is a flat circular surface, rather than a conical surface as it was in the second embodiment. Extending along and forming both the seating surface 430 and seating surface 434 of the valve body 424 is a strip of tin coated copper. The valve body 424 screws into the housing 422 and compresses the tin coated copper 430 against the seating surface 429, forming the static seal 431. Further, the primary seal 446 and the O-ring seal 454 press against surface 434 when the valve is closed. The thickness of the tin and copper seal is exaggerated for clarity in describing the invention. This embodiment has the advantage that the same piece of sealing material is used in forming both the static and dynamic seals.

Figure 11:
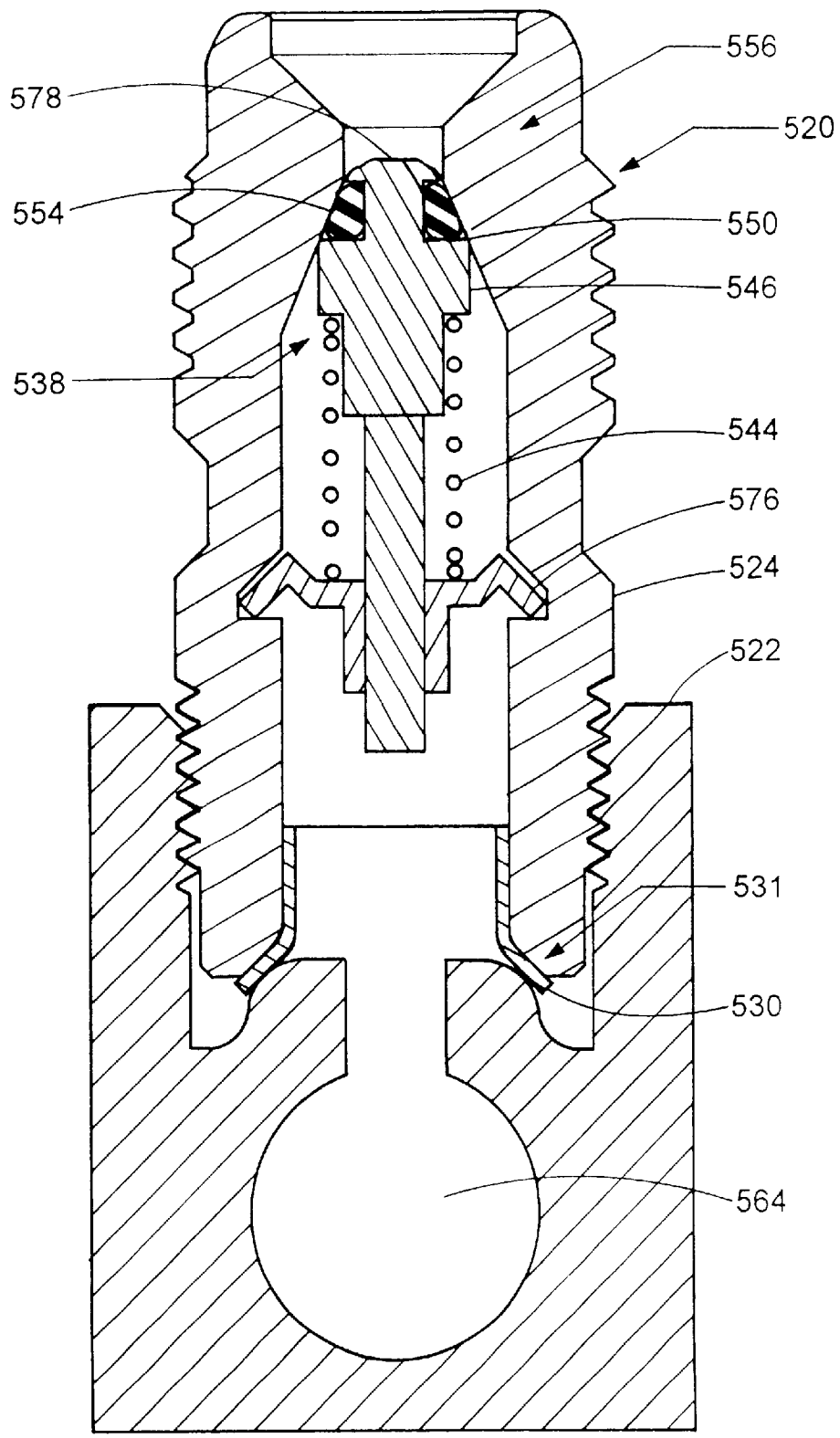
FIG. 11 is a cross sectional view of a sixth embodiment of a valve assembly.

FIG. 11 illustrates a sixth embodiment of a valve assembly. The embodiment shown in FIG. 11 has many items in common with that of FIGS. 4–7, and to avoid unnecessary repetition of the description, the same reference numerals have been used but falling within the 500 series rather than 100 series numbers. This valve assembly 520 is similar to that in the second embodiment, with the major difference being that it is an inverted valve configuration. The valve body 524 still screws into the adapter housing 522, but the housing 522 is now shaped to receive a sealing member 530, which is compressed between the housing 522 and body 524 to form the static seal 531. The sealing member 530 is preferably made of copper or tin plated copper.

The dynamic seal 556 faces out away from the refrigerant and is now closer to the tool receiving end of the valve body. It includes a primary valve seal 546 and a secondary O-ring seal 554. The primary seal 546 is again preferably made of Vespel, although it can also be formed of materials with good sealing and long term permeation resistance, such as copper, tin plated copper, or PEEK. Again the sealing face 550 of the primary seal 546 is located between the O-ring seal 554 and the refrigerant bore 564 to assures that the primary seal 546, which is made of a harder and more durable material, will significantly reduce the pressurizing of the O-ring seal 554, thus ensuring the overall integrity of the dynamic seal 556. The primary seal 546 now includes a service tool interface surface 578. To open the valve, a service tool (not shown), presses on this surface 578, pushing the valve pin assembly 538 downward against the bias of the spring 544 and the refrigerant pressure. The spring 544 is now held in place with a spring retention clip 576.

Figure 12:
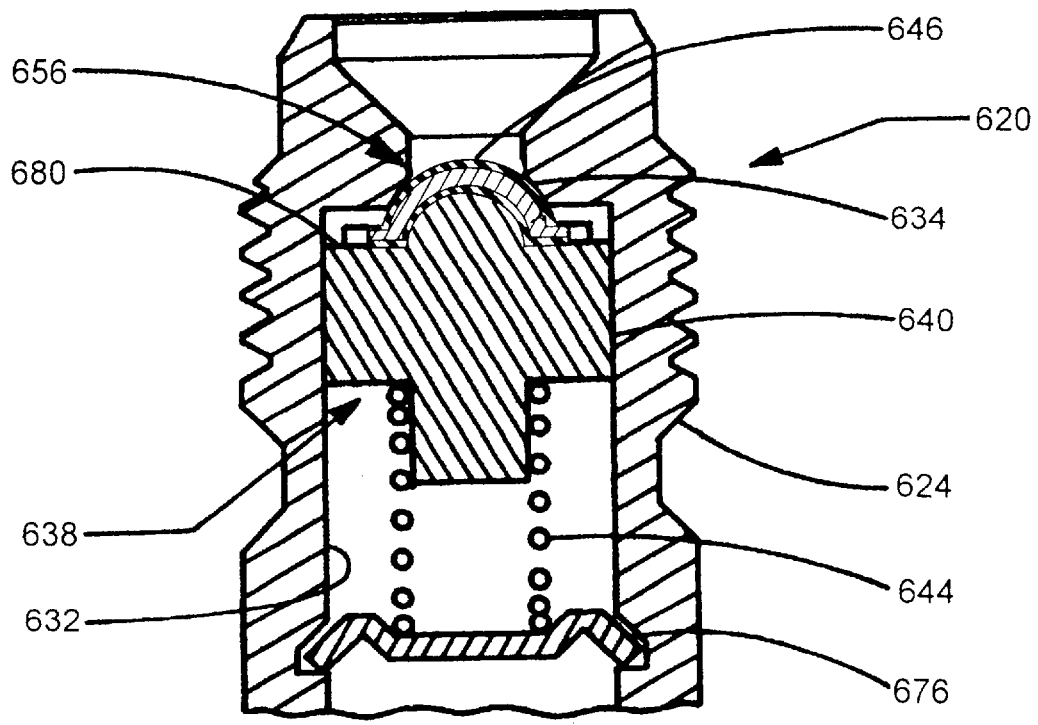
FIG. 12 is a cross sectional view similar to FIG. 11, but illustrating a seventh embodiment of a valve assembly.

FIG. 12 illustrates a seventh embodiment of a valve assembly. The embodiment shown in FIG. 12 has many items in common with that of FIG. 11, and to avoid unnecessary repetition of the description, the same reference numerals have been used but falling within the 600 series rather than 500 series numbers. This valve assembly 620 is also an inverted valve, similar to FIG. 11, but the primary seal 646 is formed on a spherical head portion of the valve pin 640. The primary seal 646 is preferably formed from rubber coated steel (like the fourth and fifth embodiments)

that is swaged around its edge to an enlarged portion 680 of the valve pin 640, in order to secure it in place. The enlarged portion 680 is preferably hexagonal in shape to allow refrigerant to flow, and slides within and is guided by the bore 632 in the valve body 624. This allows the valve pin 640 to be shorter since it is not needed to maintain the primary seal 646 in its proper orientation. Again, a spring 644 and spring retention clip 676 bias the valve pin assembly 638 against the valve seat 634 of the valve body 624 to form the dynamic seal 656. One inserting a service tool (not shown), then, would press on the center portion of the primary seal 646 to push the valve pin assembly 638 downward and open a flow path to the refrigerant.

Figure 13:
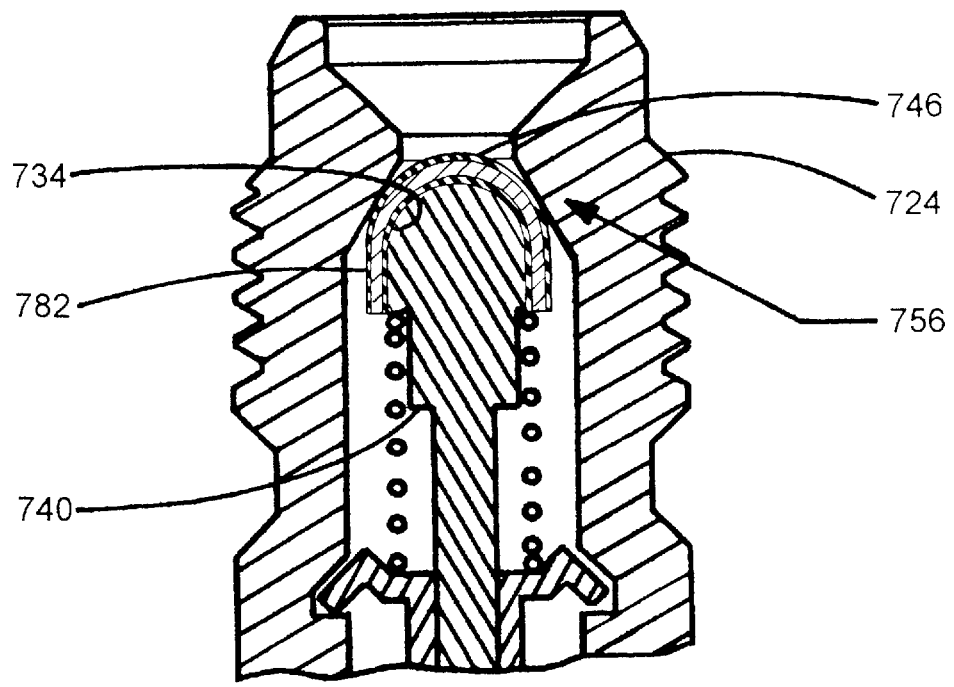
FIG. 13 is a cross sectional view similar to FIG. 11, but illustrating an eighth embodiment of a valve assembly.

FIG. 13 illustrates an eighth embodiment of a valve assembly. The embodiment shown in FIG. 13 has many items in common with that of FIG. 11, and to avoid unnecessary repetition of the description, the same reference numerals have been used but falling within the 700 series rather than 500 series numbers. The primary valve seal 746 is a rubber coated steel that is shaped to fit over a spherical head portion of the valve pin 740 (similar to the embodiment of FIG. 12). The sealing material is swaged to this head portion in a circular bead 782 about the periphery of the pin 740. This primary seal 746, then, seats against the seating surface 734 of the valve body 724 to form the dynamic seal 756.

Figure 14:
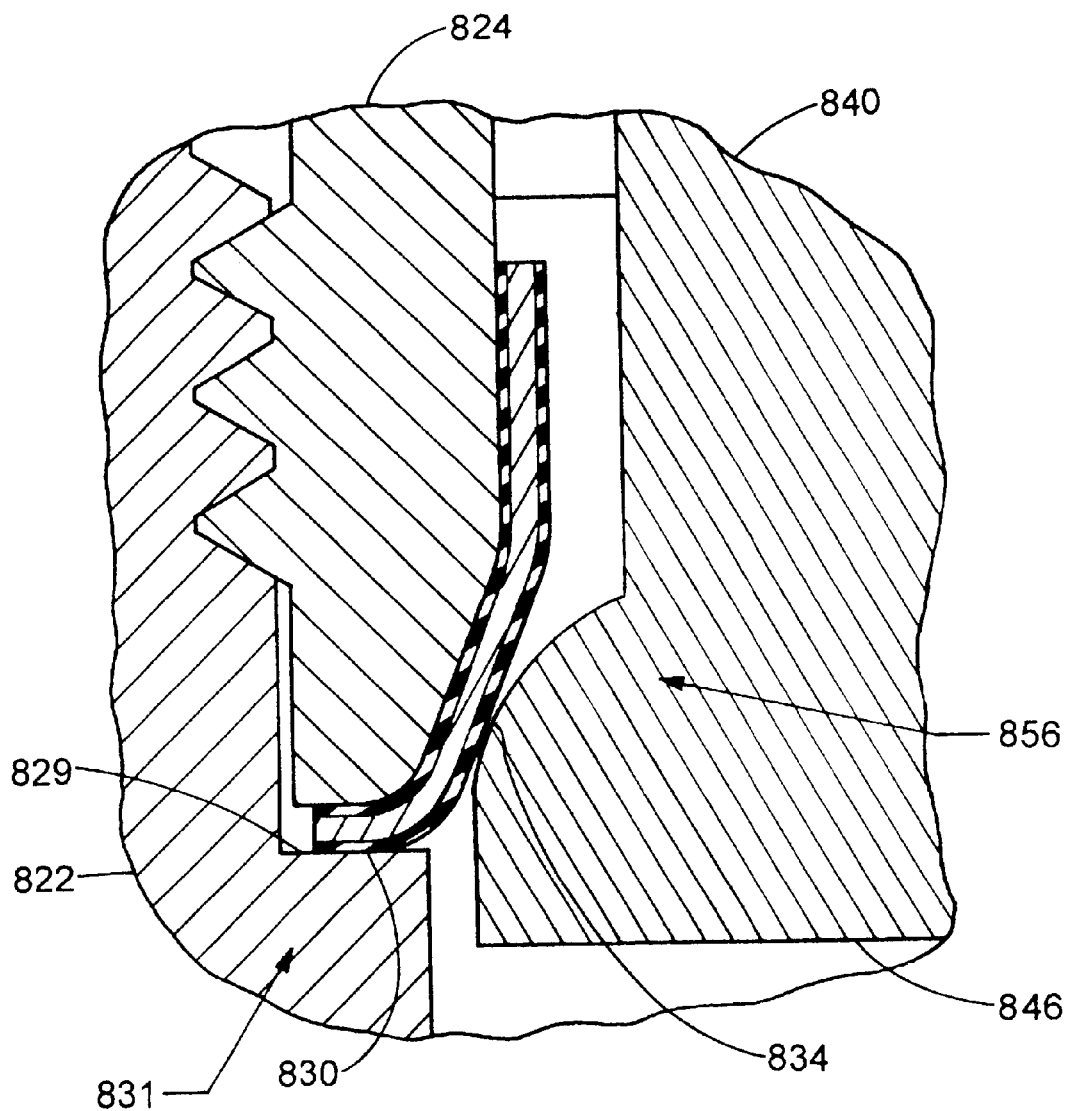
FIG. 14 is a cross-sectional view similar to FIG. 10, but illustrating a ninth embodiment of a valve assembly.

FIG. 14 illustrates a ninth embodiment of a valve assembly. The embodiment shown in FIG. 14 has many items in common with that of FIG. 10, and to avoid unnecessary repetition of the description, the same reference numerals have been used but falling within the 800 series rather than 400 series numbers. The significant differences between the fifth and ninth embodiments relate to the static seal 831 and the dynamic seal 856. The pin 840 and the primary seal 846 are preferably formed integrally, and are preferably made of brass. But these seals mate with a different seating surface. The seating surface 829 of the adapter housing 822 is a flat circular surface. Extending along and forming both the seating surface 830 and the seating surface 834 of the valve body 824 is a strip of rubber coated steel. The valve body 824 screws into the housing 822 and compresses the rubber coated steel 830 against the seating surface 829, forming the static seal 831. Further, the primary seal 846 press against surface 834 when the valve is closed. Again, the thickness of the steel and rubber seal is exaggerated for clarity in describing the invention. The advantage of having the rubber coated steel are the same as those discussed above in relation to the fourth embodiment. Further, there is the advantage that the same piece of sealing material is used in forming both the static and dynamic seals.

While certain embodiments of the present invention have been described in detail, those familiar with the art to which this invention relates will recognize various alternative designs and embodiments for practicing the invention as defined by the following claims.

What is claimed is:

1. A service valve for an air conditioning system adapted to selectively connect pressurized refrigerant within a cavity of the air conditioning system to a service tool, the service valve comprising:

a valve body defining a valve bore having a first end exposed to the cavity and a second end adapted for operatively engaging the service tool, with the bore including a dynamic valve seating surface;

a valve pin assembly, mounted and slidable within the valve bore between an open position and a closed position, with the valve pin assembly including a dynamic seal portion which is made of a thin metal layer and a first, relatively thinner, elastomeric material layer covering the metal layer that is substantially softer than the metal layer, and with the dynamic seal portion sealingly engagable to the dynamic valve seating surface through surface contact with the elastomeric layer when the valve pin assembly is in the closed position; and a biaser that contacts the valve pin assembly and biases the valve pin assembly toward the closed position.

2. The service valve of claim 1 wherein the thin metal layer is steel.

3. The service valve of claim 2 wherein the elastomeric material layer is rubber.

4. The service valve of claim 3 wherein the metal layer is about 0.010 inches thick.

5. The service valve of claim 4 wherein the elastomeric material layer is about 0.0025 inches thick.

6. The service valve of claim 1 further including a second elastomeric layer covering an opposed side of the metal layer from the first elastomeric layer.

7. The service valve of claim 1 wherein the valve pin assembly includes a valve pin and a valve head integral with the valve pin, with the dynamic seal portion mounted on the valve head.

8. The service valve of claim 1 further including an adapter having a refrigerant bore, and an adapter bore extending between the refrigerant bore at a first end and a second end adapted for receiving the service tool, and with the adapter bore including a static seal seating surface; and wherein the valve body threadably mounts within the adapter bore and includes a static seal surface that sealingly engages the static seal seating surface.

9. The service valve of claim 8 wherein the adapter bore includes a refrigerant passage that receives and guides the dynamic seal portion when the valve pin assembly is in the open position.

10. The service valve of claim 1 wherein the valve pin assembly and the valve body are configured to form an inverted valve assembly such that the dynamic seal portion is mounted in the valve bore closer to the second end of the valve bore.

11. The service valve of claim 10 wherein the valve pin assembly includes a generally spherical head portion and the dynamic seal portion is mounted on the spherical head portion.

12. The service valve of claim 11 wherein the dynamic seal portion has a periphery and is swaged to the spherical head portion about the periphery.

13. The service valve of claim 12 wherein the biaser is a helical spring.

14. The service valve of claim 13 further including an adapter having a refrigerant bore, and an adapter bore extending between the refrigerant bore at a first end and a second end adapted for receiving the service tool, and with the adapter bore including a static seal seating surface; and wherein the valve body threadably mounts within the adapter bore and includes a static seal surface that sealingly engages the static seal seating surface.

15. The service valve of claim 14 wherein the static seal surface is made of tin, plated over a copper substrate.

16. The service valve of claim 14 wherein the metal layer is steel and the first elastomeric material layer is rubber.

17. A service valve for an air conditioning system adapted to selectively connect pressurized refrigerant within a cavity of the air conditioning system to a service tool, the service valve comprising:

a valve body defining a valve bore having a first end exposed to the cavity and a second end adapted for operatively engaging the service tool, with the bore including a dynamic valve seating surface;

a valve pin assembly, mounted and slidable within the valve bore between an open position and a closed position, with the valve pin assembly including a dynamic seal portion, with one of the dynamic valve seating surface and the dynamic seal portion made of a metal layer and a relatively thinner, elastomeric layer covering the metal layer that is substantially softer than the metal layer, such that the dynamic seal portion is sealingly engagable to the dynamic valve seating surface through surface contact with the elastomeric layer; and a biaser that contacts the valve pin assembly and biases the valve pin assembly toward the closed position.

18. The service valve of claim 17 wherein the metal layer is about 0.010 inches thick and the elastomeric layer is about 0.0025 inches thick.

19. The service valve of claim 17 further including an adapter housing having a refrigerant bore, and an adapter bore extending between the refrigerant bore at a first end and a second end adapted for receiving the service tool, and with the adapter bore including a static seal seating surface; and wherein the valve body threadably mounts within the adapter bore and includes a static seal surface that sealingly engages the static seal seating surface; and wherein the metal layer and elastomeric layer extend to mount between the static seal surface and the static seal seating surface to form a static seal.

20. A service valve for an air conditioning system adapted to selectively connect pressurized refrigerant within a cavity of the air conditioning system to a service tool, the service valve comprising:

a valve body defining a valve bore having a first end exposed to the cavity and a second end adapted for operatively engaging the service tool, with the bore including a dynamic valve seating surface;

a valve pin assembly, mounted and slidable within the valve bore between an open position and a closed position, with the valve pin assembly including a dynamic seal portion which is made of a thin metal layer and a first, relatively thinner, elastomeric material layer covering the metal layer that is substantially softer than the metal layer, and with the dynamic seal portion sealingly engagable to the dynamic valve seating surface through surface contact with the elastomeric layer when the valve pin assembly is in the closed position;

a biaser that contacts the valve pin assembly and biases the valve pin assembly toward the closed position; and an adapter having a refrigerant bore, and an adapter bore extending between the refrigerant bore at a first end and a second end adapted for receiving the service tool, and with the adapter bore including a static seal seating surface; and the valve body threadably mounting within the adapter bore and including a static seal surface that sealingly engages the static seal seating surface.

\* \* \* \* \*